United States Patent
Vijayvargiya et al.

(10) Patent No.: US 11,575,646 B2
(45) Date of Patent: Feb. 7, 2023

(54) DOMAIN NAME SERVICE (DNS) SERVER CACHE TABLE VALIDATION

(71) Applicant: VMWARE, INC., Palo Alto, CA (US)

(72) Inventors: Shirish Vijayvargiya, Pune (IN); Sunil Hasbe, Pune (IN); Nakul Ogale, Pune (IN); Sachin Shinde, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/874,706

(22) Filed: May 15, 2020

(65) Prior Publication Data
US 2021/0288937 A1 Sep. 16, 2021

(30) Foreign Application Priority Data
Mar. 12, 2020 (IN) .............................. 202041010541

(51) Int. Cl.
*H04L 61/4552* (2022.01)
*H04L 61/103* (2022.01)
*H04L 61/4511* (2022.01)

(52) U.S. Cl.
CPC ........ *H04L 61/4552* (2022.05); *H04L 61/103* (2013.01); *H04L 61/4511* (2022.05)

(58) Field of Classification Search
CPC . H04L 61/1552; H04L 61/103; H04L 61/1511
See application file for complete search history.

(56) References Cited

U.S. PATENT DOCUMENTS

| | | | | |
|---|---|---|---|---|
| 1 A | * | 7/1836 | Ruggles | B61C 11/04 295/4 |
| 5,751,971 A | | 5/1998 | Dobbins et al. | |
| 6,067,620 A | * | 5/2000 | Holden | H04L 63/0218 713/155 |
| 7,134,012 B2 | * | 11/2006 | Doyle | H04L 29/12009 713/151 |
| 7,490,351 B1 | * | 2/2009 | Caves | H04L 29/12028 726/13 |
| 7,620,733 B1 | * | 11/2009 | Tzakikario | H04L 61/1511 709/245 |
| 8,370,933 B1 | * | 2/2013 | Buckler | H04L 63/14 726/22 |
| 8,407,471 B1 | | 3/2013 | Sobel | |

(Continued)

OTHER PUBLICATIONS

U.S. Appl. No. 16/660,835, filed Oct. 23, 2019, Shirish Vijayvargiya et al.

(Continued)

*Primary Examiner* — Jimmy H Tran
(74) *Attorney, Agent, or Firm* — Adeli LLP

(57) ABSTRACT

In some embodiments, a method stores domain name system (DNS) resolution mappings from a domain name to an address in a first table. The DNS resolution mappings are intercepted from DNS responses being sent by a DNS server. The first table is sent to a manager for validation of the DNS resolution mappings. Then, a second table is received from the manager that contains validated DNS resolution mappings. The method intercepts a DNS response that includes a domain name to address resolution mapping from the DNS server and validates the domain name to address resolution mapping using a validated DNS resolution mapping in the second table.

20 Claims, 6 Drawing Sheets

(56) References Cited

U.S. PATENT DOCUMENTS

| | | | |
|---|---|---|---|
| 8,621,556 B1 | 12/2013 | Bharali et al. | |
| 8,799,482 B1 | 8/2014 | Stamos | |
| 8,804,729 B1* | 8/2014 | Melman | H04L 63/1466 370/392 |
| 8,879,554 B2 | 11/2014 | Emmadi et al. | |
| 9,300,623 B1* | 3/2016 | Earl | H04L 61/1511 |
| 9,398,045 B2* | 7/2016 | Lee | H04L 63/1466 |
| RE47,019 E* | 8/2018 | Thornewell | H04L 61/4511 |
| 10,855,644 B1* | 12/2020 | Vijayvargiya | H04L 63/123 |
| 11,201,847 B2* | 12/2021 | Vijayvargiya | H04L 61/103 |
| 2003/0070096 A1 | 4/2003 | Pazi et al. | |
| 2003/0163722 A1 | 8/2003 | Anderson | |
| 2004/0059909 A1* | 3/2004 | Le Pennec | H04L 63/12 713/153 |
| 2006/0062141 A1 | 3/2006 | Oran | |
| 2006/0088037 A1* | 4/2006 | Finley, Jr. | H04L 29/12009 370/395.54 |
| 2006/0206611 A1 | 9/2006 | Nakamura | |
| 2006/0209818 A1* | 9/2006 | Purser | H04L 29/12009 370/389 |
| 2007/0153738 A1* | 7/2007 | Barker, Jr. | H04W 40/36 370/331 |
| 2007/0192858 A1* | 8/2007 | Lum | H04L 29/12028 726/22 |
| 2007/0248085 A1* | 10/2007 | Volpano | H04L 29/12028 370/389 |
| 2007/0261112 A1* | 11/2007 | Todd | G06F 21/577 726/11 |
| 2008/0043761 A1 | 2/2008 | Kumar et al. | |
| 2008/0195700 A1* | 8/2008 | Jonsson | H04L 29/12811 709/203 |
| 2009/0089426 A1* | 4/2009 | Yamasaki | H04L 63/0236 709/225 |
| 2009/0198800 A1 | 8/2009 | Dighe et al. | |
| 2010/0036969 A1* | 2/2010 | Perry | H04L 63/1483 707/E17.014 |
| 2010/0107250 A1* | 4/2010 | Li | H04L 63/1466 726/22 |
| 2010/0121981 A1* | 5/2010 | Drako | H04L 63/0245 709/245 |
| 2010/0199122 A1* | 8/2010 | Sood | H04L 61/1511 714/4.1 |
| 2011/0035784 A1 | 2/2011 | Jakobsson | |
| 2011/0066807 A1 | 3/2011 | Hay et al. | |
| 2011/0194563 A1* | 8/2011 | Shen | H04L 67/1002 370/395.52 |
| 2011/0209222 A1* | 8/2011 | Sharp | G06F 21/566 726/26 |
| 2011/0321139 A1 | 12/2011 | Jayaraman et al. | |
| 2012/0011584 A1* | 1/2012 | Kwan | H04L 63/1466 726/13 |
| 2012/0087319 A1 | 4/2012 | Raleigh et al. | |
| 2012/0096166 A1 | 4/2012 | Devarapalli et al. | |
| 2012/0179801 A1 | 7/2012 | Luna et al. | |
| 2012/0254996 A1 | 10/2012 | Wilbourn et al. | |
| 2012/0278626 A1* | 11/2012 | Smith | H04L 63/123 713/168 |
| 2012/0297478 A1* | 11/2012 | Martin | H04L 29/12811 726/22 |
| 2013/0036307 A1* | 2/2013 | Gagliano | H04L 63/0823 713/171 |
| 2013/0044754 A1 | 2/2013 | Zhu | |
| 2013/0054671 A1* | 2/2013 | Maki | H04L 61/4511 709/217 |
| 2013/0103784 A1 | 4/2013 | Lyon | |
| 2013/0107889 A1* | 5/2013 | Barabash | H04L 61/103 370/409 |
| 2013/0243004 A1 | 9/2013 | Hikichi et al. | |
| 2013/0291101 A1 | 10/2013 | Karasaridis | |
| 2013/0318602 A1* | 11/2013 | Devarapalli | H04L 67/1002 726/22 |
| 2013/0347095 A1 | 12/2013 | Barjatiya et al. | |
| 2014/0022936 A1 | 1/2014 | Robitaille et al. | |
| 2014/0089523 A1 | 3/2014 | Roy et al. | |
| 2014/0195666 A1* | 7/2014 | Dumitriu | H04L 49/70 709/223 |
| 2014/0325651 A1* | 10/2014 | Kim | H04L 63/1466 726/23 |
| 2015/0058488 A1 | 2/2015 | Backholm | |
| 2015/0074221 A1 | 3/2015 | Kuparinen et al. | |
| 2015/0163245 A1* | 6/2015 | Kondamuru | H04L 63/08 726/6 |
| 2015/0358276 A1* | 12/2015 | Liu | H04L 61/1511 726/1 |
| 2016/0012008 A1 | 1/2016 | Akiyoshi | |
| 2016/0026796 A1 | 1/2016 | Monrose et al. | |
| 2016/0156660 A1* | 6/2016 | Dagon | H04L 63/1441 726/22 |
| 2016/0197898 A1* | 7/2016 | Hozza | H04L 63/1466 713/168 |
| 2016/0212204 A1 | 7/2016 | Huang et al. | |
| 2016/0241509 A1 | 8/2016 | Akcin | |
| 2016/0248728 A1 | 8/2016 | Evans | |
| 2016/0255012 A1 | 9/2016 | Mizrachi et al. | |
| 2016/0301655 A1* | 10/2016 | Lim | H04L 61/6009 |
| 2016/0330230 A1* | 11/2016 | Reddy | H04L 9/002 |
| 2016/0337236 A1 | 11/2016 | Hsu et al. | |
| 2017/0093802 A1* | 3/2017 | Norum | H04L 63/0428 |
| 2017/0093912 A1* | 3/2017 | Poomalai | H04L 63/1466 |
| 2017/0118250 A1 | 4/2017 | Phillips | |
| 2017/0142060 A1 | 5/2017 | Thakar | |
| 2017/0214677 A1* | 7/2017 | Cai | H04L 63/1458 |
| 2017/0264590 A1 | 9/2017 | Xing | |
| 2017/0272454 A1 | 9/2017 | Seo et al. | |
| 2017/0310484 A1* | 10/2017 | Kaliski, Jr. | H04L 61/305 |
| 2017/0310709 A1 | 10/2017 | Foxhoven et al. | |
| 2017/0324724 A1* | 11/2017 | Smith | H04L 9/3247 |
| 2017/0346855 A1 | 11/2017 | Reddy et al. | |
| 2017/0374017 A1 | 12/2017 | Gautam et al. | |
| 2018/0019968 A1* | 1/2018 | Redekop | H04L 61/2007 |
| 2018/0027012 A1* | 1/2018 | Srinivasan | H04L 63/101 726/4 |
| 2018/0034827 A1 | 2/2018 | Kaliski, Jr. et al. | |
| 2018/0219833 A1* | 8/2018 | Reddy | H04L 61/1511 |
| 2018/0343122 A1 | 11/2018 | Spacek et al. | |
| 2019/0081958 A1 | 3/2019 | Lee | |
| 2019/0190948 A1* | 6/2019 | Xie | H04L 63/20 |
| 2019/0238504 A1 | 8/2019 | Gupta et al. | |
| 2019/0306166 A1 | 10/2019 | Konda et al. | |
| 2020/0127965 A1* | 4/2020 | Oron | G06F 16/1805 |
| 2020/0167281 A1 | 5/2020 | Flores et al. | |
| 2020/0213265 A1 | 7/2020 | Deshpande et al. | |
| 2020/0228495 A1* | 7/2020 | Ogale | H04L 43/16 |
| 2021/0084004 A1 | 3/2021 | Vijayvargiya et al. | |
| 2021/0250349 A1* | 8/2021 | Konda | H04L 63/166 |

OTHER PUBLICATIONS

Paul Schnackenburg, "A Look at Azure Confidential Computing", Redmond Magazine, Feb. 5, 2019, 8 pages.
VMware, "Securing Windows Guest Operating Systems with Virtualization-based Security", VMware Docs, May 31, 2019, 2 pages.
Microsoft, "Virtualization-based Security (VBS)", Hardware Dev Center, Oct. 4, 2017, 4 pages.
Related Application, Shirish Vijayvargiya et al., entitled "Address Resolution Protocol Entry Verification", India Patent Application No. 201941036243, filed Sep. 9, 2019, 39 pages.
Related Application, Shirish Vijayvargiya et al., entitled "Address Resolution Protocol Entry Verification", U.S. Appl. No. 16/660,835, filed Oct. 23, 2019, 30 pages.
Related Application, Shirish Vijayvargiya et al., entitled "Domain Name Service (DNS) Server Cache Table Validation", India Patent Application No. 202041010541, filed Mar. 12, 2020, 44 pages.
Olzak, Tom, "DNS Cache Poisoning: Definition and Prevention," Mar. 2006, 9 pages, www.infosecwriters.com.
Trostle, Jonathan, et al., "Protecting Against DNS Cache Poisoning Attacks," 2010 6th IEEE Workshop on Secure Network Protocols, Oct. 5, 2010, 6 pages, IEEE, Kyoto, Japan.
Xi, Yu, et al., "Recovering and Protecting Against DNS Cache Poisoning Attacks," 2011 International Conference of Information

(56) References Cited

OTHER PUBLICATIONS

Technology, Computer Engineering, and Management Sciences, Sep. 24-25, 2011, 4 pages, IEEE, Nanjing, China.

Yuan, Lihua, et al., "DoX: A Peer-to-Peer Antidote for DNS Cache Poisoning Attacks," 2006 IEEE International Conference on Communications, Jun. 11-15, 2006, 6 pages, IEEE, Istanbul, Turkey.

* cited by examiner

DOMAIN NAME SERVICE (DNS) SERVER CACHE TABLE VALIDATION

RELATED APPLICATIONS

Benefit is claimed under 35 U.S.C. 119(a)-(d) to Foreign Application Serial No. 202041010541 filed in India entitled "DOMAIN NAME SERVICE (DNS) SERVER CACHE TABLE VALIDATION" on Mar. 12, 2020, by VMWARE, Inc., which is herein incorporated in its entirety by reference for all purposes.

BACKGROUND

Domain Name System (DNS) maps domain names that are assigned to entities to another address, such as Internet Protocol (IP) addresses. A typical domain name may identify a website for an entity. The domain names provide names for domains that are more easily remembered than IP addresses, such as "company name.com" maps to the IP address of "204.120. 0.15". However, a client does not use the domain name to contact a server that is hosting the website associated with the domain name; rather, the client uses the IP address for the server. When a client receives a domain name, such as the client receives a request from a browser to navigate to a domain name, the client contacts a DNS server to resolve the domain name to an IP address. The DNS server may respond with a mapping of the domain name to an IP address. To determine the IP address for a domain name, the DNS server may use a DNS cache table that stores DNS resolution mappings, such as domain name to IP address resolution mappings. The DNS server may look up the domain name in the DNS cache table to determine the corresponding IP address. However, if the DNS server does not have a mapping in its DNS cache table, the DNS server may contact other DNS servers to resolve the domain name. For example, the domain name system architecture is a distributed database that may require multiple queries to multiple DNS servers to determine the corresponding IP address. Upon receiving a response with the resolution mapping, the DNS server returns the IP address and caches the resolution mapping in its DNS cache table for later use. Using the DNS cache table, the DNS server may not need to contact another DNS server to respond to subsequent requests for the resolution mapping of the domain name.

DNS cache poisoning or DNS spoofing is a type of attack that exploits vulnerabilities in the domain name system method of resolving domain names to IP addresses. For example, an attack on a DNS cache table may attempt to divert traffic away from legitimate servers towards compromised servers associated with attackers. The attack may exploit the lack of authentication in the DNS protocol by sending spoofed DNS messages in response to DNS resolution requests. For example, the attack attempts to associate an IP address for a machine associated with the attacker instead of the correct IP address of the machine that is legitimately hosting the website for the domain name. To poison the DNS cache, an attacker may send the DNS server resolution requests for a domain name. When the DNS server does not have the domain name in its DNS cache, the DNS server send a resolution request to another DNS server. The attacker may send a response with the incorrect IP address to the DNS server. The DNS server then stores the incorrect DNS resolution mapping in its DNS cache. The attack may flood the DNS server with incorrect DNS resolution requests until the DNS cache is overwhelmed and contains only the domain name to IP address resolution mappings that the attacker has injected. For example, the attacker-injected resolution mappings overwrite the legitimate DNS cache entries because the cache table may only store a certain number of entries and the newer entries overwrite the older entries. This poisons the DNS cache table with bad entries. The DNS server does not authenticate the resolution mappings that the attacker has injected and thus does not detect compromised domain name to IP address resolution mapping into the DNS cache. Accordingly, if the attack is successful, any traffic meant for a target machine of a compromised domain name is sent to the IP address of the machine associated with the attacker.

When a client receives a compromised DNS resolution mapping, the client then directs traffic to the IP address of the machine for the attacker. Then, the attacker may choose to perform malicious activities, such as inspecting the packets (e.g., spying). The attacker may forward the traffic to the actual default destination to avoid discovery, modify the data before forwarding it (e.g., a man-in-the-middle attack), or launch a denial of service attack causing some or all the packets in the network to be dropped.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
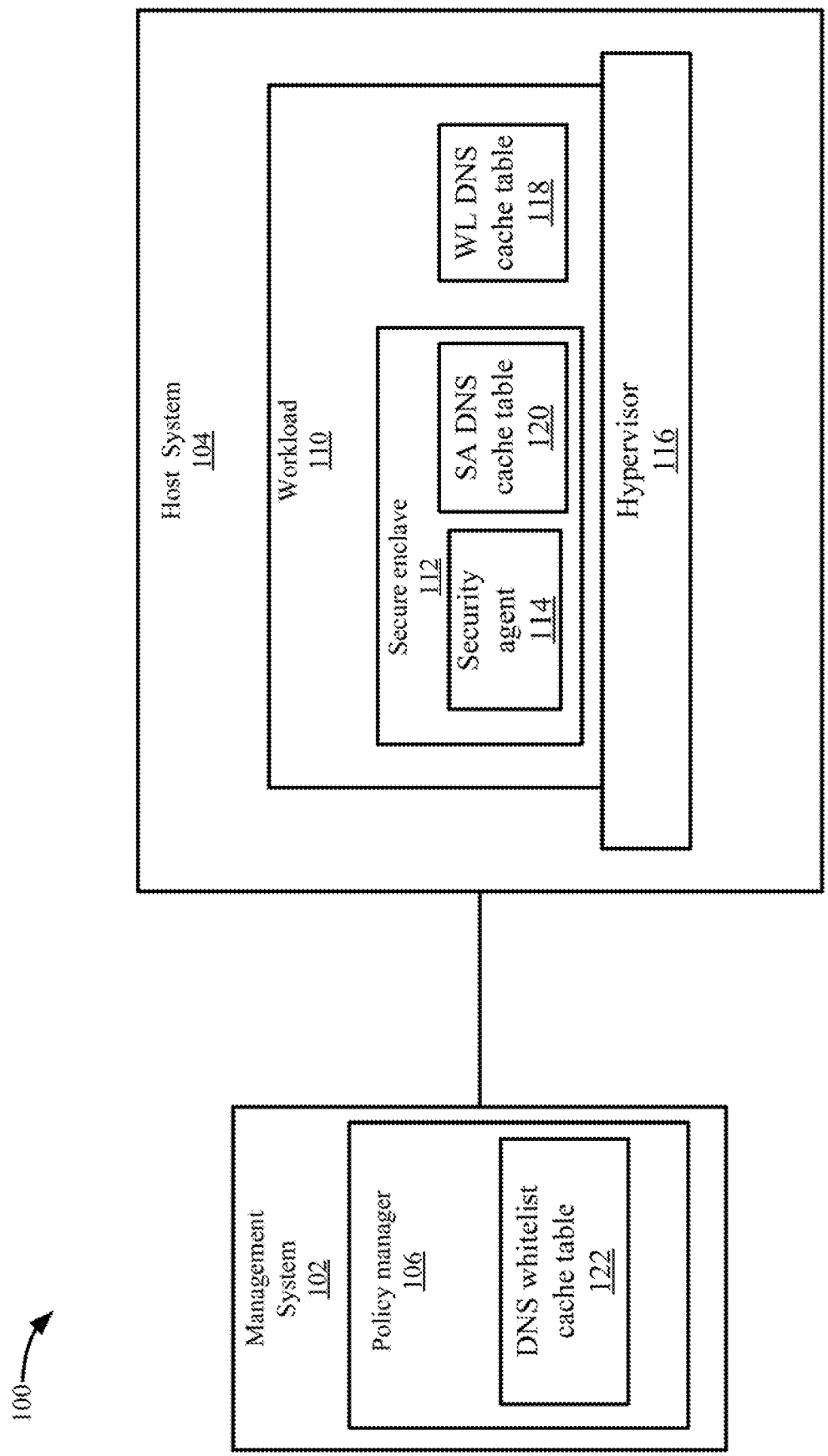
FIG. 1 depicts a simplified system configured to perform a DNS resolution validation process according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments validate address resolution mappings, such as domain name system (DNS) resolution mappings, using a security agent. A security agent may operate in a first phase, such as a learning phase, to intercept DNS resolution requests that are received by a workload and DNS address resolution responses that are sent by the workload. The workload may include a DNS server that is responding to DNS resolution requests. The workload may operate as a DNS server as described above and build a DNS cache table, which is referred to as a workload (WL) DNS cache table. The security agent may build and update its own DNS cache table (referred to as a security agent (SA) DNS cache table) based on the DNS resolution responses. The security agent may then send the DNS cache table to a policy manager at certain intervals for validation.

During the learning phase, the policy manager validates the entries in the SA DNS cache. For example, the policy manager may validate each DNS resolution mapping by verifying the IP address associated with a corresponding domain name. In some embodiments, the policy manager may send DNS resolution requests to multiple DNS servers and/or requests to perform DNS reverse lookups to DNS servers. A DNS reverse lookup may map an IP address to a domain name whereas a DNS resolution request maps a domain name to an IP address. After receiving the responses, the policy manager may validate the DNS entry as a legitimate entry or invalidate the entry. For example, if the number of responses do not meet a threshold in mapping the IP address to the same domain name, such as one or more responses do not map the IP address to the same domain name, the policy manager may invalidate the entry.

The policy manager may receive SA DNS cache tables from multiple workloads that are operating as DNS servers. The policy manager then creates a DNS whitelist cache table that contains validated DNS resolution mappings from the SA DNS cache tables. For example, if the policy manager validates a DNS entry, the policy manager may insert that entry in the DNS whitelist cache table. If the policy manager invalidates a DNS entry, the policy manager may not insert that DNS entry in the DNS whitelist cache table. Based on the above, the policy manager creates a legitimate global DNS whitelist cache table that can be distributed to multiple workloads operating as DNS servers.

After generating the DNS whitelist cache table, the policy manager may then send the DNS whitelist cache table to the security agent. The security agent may then transition from the first phase to a second phase, such as from a learning phase to a detection phase. For example, the learning phase may last a period of time, such as a number of days or weeks, and after which, the workload switches to the detection phase. In the detection phase, when the security agent intercepts a DNS resolution request and intercepts the DNS resolution response with the DNS resolution mapping, the security agent can then compare the DNS resolution mapping with DNS resolution mappings in the DNS whitelist cache. If a DNS resolution mapping for a domain name is resolved to a different IP address than that listed in a DNS resolution mapping in the DNS whitelist cache, a security agent detects a change in the mapping. Then, the security agent may perform an action, such as outputting an alert of the change to the policy manager. Also, the security agent may not allow the DNS resolution response to be sent to a client. Or, the security agent may perform other actions, such as changing the domain name to an IP address mapping to the correct IP address that is listed in the DNS whitelist cache.

One method to address the DNS cache poisoning attack is to assign static domain name to IP address resolution mappings. Each workload would have to be programmed manually with all the static mappings. There is no resolution in this case and the solution is not very scalable. The validation process described herein allows dynamic domain name to IP address resolution while maintaining validation of the resolution mappings.

System Overview

FIG. 1 depicts a simplified system 100 configured to perform a DNS resolution validation process according to some embodiments. System 100 includes a management system 102 and a host system 104. Although one management system 102 and one host system 104 are described, multiple instances of management systems and host systems may be appreciated. For example, management system 102 may perform the process described for multiple host systems 104.

Host system 104 may include a workload 110 in addition to other workloads (not shown). Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized. For example, DNS servers may not be implemented in workloads.

Workload 110 may be operating a DNS server, which responds to DNS resolution requests with DNS resolution responses. As discussed above, domain name system may be a distributed database of resolution mappings that is used to resolve domain names to IP addresses. The distributed database includes a hierarchy of DNS servers. The DNS servers as discussed may be included at any level of the hierarchy. For example, a client making the initial DNS resolution request may include a DNS server (e.g., implemented in a browser), the DNS server may be included in a subnetwork for the client, in other networks, etc.

A security agent 114 may be associated with workload 110. In some embodiments, security agent 114 may be installed in workload 110. However, security agent 114 may be installed in other locations, such as in a hypervisor 116, another workload, etc.

In some embodiments, host system 104 installs security agent 114 in a secure area, such as by using an enclave-based technology to install security agent 114 in a secure enclave 112. Secure enclave 112 may run software code for security agent 114 in the same context as workload 110, but secure enclave 112 keeps the software code for security agent 114 completely isolated from other processes running on workload 110, an operating system of workload 110, or other processes running on host system 104. For example secure enclave 112 may be implemented in a Guest Monitoring Mode (GMM) that provides a special mode that keeps the software code for security agent 114 completely isolated from other processes running on workload 110, an operating system of workload 110, or other processes running on host system 104. In other embodiments, virtualization-based security (VBS) may be used to generate the secure enclave. In some embodiments, secure enclave 112 is created in workload 110 using a hypervisor-based enclave technology, which may be a region of memory in the guest memory address space of workload 110 that is isolated from, and thus inaccessible by, other processes running in workload 110 (including privileged processes such as the workload's guest operating system kernel). Thus, any code running in secure enclave 112 may not be compromised via attacks within workload 110, including attacks that target the guest operating system. The memory assigned to secure enclave 112 may be invisible to other processes running in workload 110, and memory may not be accessed by processes running in workload 110. Although secure enclave 112 is discussed, a secure enclave may not be used and software code of security agent 114 may be accessible to other processes. However, using secure enclave 112 may ensure that information stored by security agent 114 and used in the validation processes discussed below is not corrupted. Also, other methods of securing the software code of security agent 114 may be appreciated.

Security agent 114 may operate in multiple phases, but multiple phases may not be used. In some embodiments, a first phase, which may be referred to as a learning phase, is performed to learn DNS whitelist cache 112. Then, security agent 114 performs a second phase, which may be referred to as a detection phase, to detect possible compromised DNS resolution mappings, which are resolution mappings from a domain name to an incorrect IP address. The following will describe the learning phase and then the detection phase.

In the learning phase, security agent 114 may build a security agent (SA) DNS cache table 120. SA DNS cache table 120 may be any type of data structure that can store DNS resolution mappings and SA DNS cache table 120 may be stored in secure enclave 112. SA DNS cache table 120 may be similar to a workload (WL) DNS cache table 118, but is stored in secure enclave 112 and cannot be corrupted by an attacker that may gain access to workload 110.

To build SA DNS cache table 120, security agent 114 may intercept DNS resolution requests to workload 110 and/or DNS resolution responses by workload 110 to build SA DNS cache table 120. For example, workload 110 may include a DNS server that is receiving DNS resolution requests from clients or other DNS servers (not shown) and responds to the DNS resolution requests with DNS resolution responses. The DNS resolution responses may include domain name to address, such as IP address, resolution mappings. The IP address may identify an address for a computing machine that is associated with the domain name, such as a server that hosts a website for the domain name. Although an IP address is described, other types of identification may be used.

As discussed above, in the domain name system, workload 110 may receive a DNS resolution request and may use entries in WL DNS cache table 118 to determine a domain name to IP address resolution mapping. For example, WL DNS cache table 118 may include the mapping for the domain name. In this case, workload 110 may not contact another DNS server to resolve the DNS resolution request. Rather, workload 110 generates the DNS resolution response using the entry in WL DNS cache table 118. However, a DNS server may not include all possible DNS resolution mappings. If WL DNS cache table 118 does not include an entry for the domain name, workload 110 may have to communicate with other DNS servers to determine the result of a DNS resolution mapping. For example, another workload in the hierarchy is contacted and that workload may determine if its WL DNS cache includes an entry for the domain name. If so, the workload may respond with the domain name to IP address mapping. If not, the workload may contact another workload in the hierarchy, and so on. At some point, a DNS server may have the DNS resolution mapping and returns the DNS resolution mapping to workload 110. Upon receiving the domain name to IP address resolution mapping, workload 110 sends a response, such as responds to the client or another DNS server, and stores the DNS resolution mapping in WL DNS cache table 118. However, security agent 114 intercepts the response before the response is sent. For example, security agent 114 may install mechanisms, such as hooks, that intercept the DNS resolution requests and responses from workload 110. When the response is intercepted, security agent 114 may add the domain name to IP address response to its SA DNS cache table 120 to mirror the entries in WL DNS cache table 118.

During the learning phase, security agent 114 may send the SA DNS cache table 120 at periodic intervals to policy manager 106. Policy manager 106 may validate address resolution mappings as will be described in more detail below. Policy manager 106 may be located remotely from host system 104 on a management system 102, but policy manager 106 may be located in different locations.

During validation, policy manager 106 creates a DNS whitelist cache table 122. DNS whitelist cache table 122 may be a data structure that includes validated domain name to IP address resolution mappings. As will be discussed in more detail below, policy manager 106 may receive SA DNS cache tables 120 from multiple workloads 110 operating as DNS servers. Policy manager 106 then builds DNS whitelist cache table 122 based on the validated entries from multiple SA DNS cache tables 120. Using multiple SA DNS cache tables 120 creates a global DNS whitelist cache table 122 that may include validated DNS resolution mappings from multiple levels of the DNS server hierarchy. However, DNS whitelist cache table 122 only contain validated entries from SA DNS cache tables 120 from only workload 110 (e.g., this is not a global whitelist). Upon the end of the learning phase, policy manager 106 sends DNS whitelist cache table 122 to security agent 114. Then, security agent 114 performs a second phase, which may be referred to as a detection phase, to detect possible compromised DNS resolution mappings (e.g., mappings that map a domain name to a wrong IP address). For example, when a change to a domain name to IP address resolution occurs in DNS whitelist cache table 122, security agent 114 may perform a remedial action. The detection phase will be described in more detail below.

Learning Phase

Figure 2:
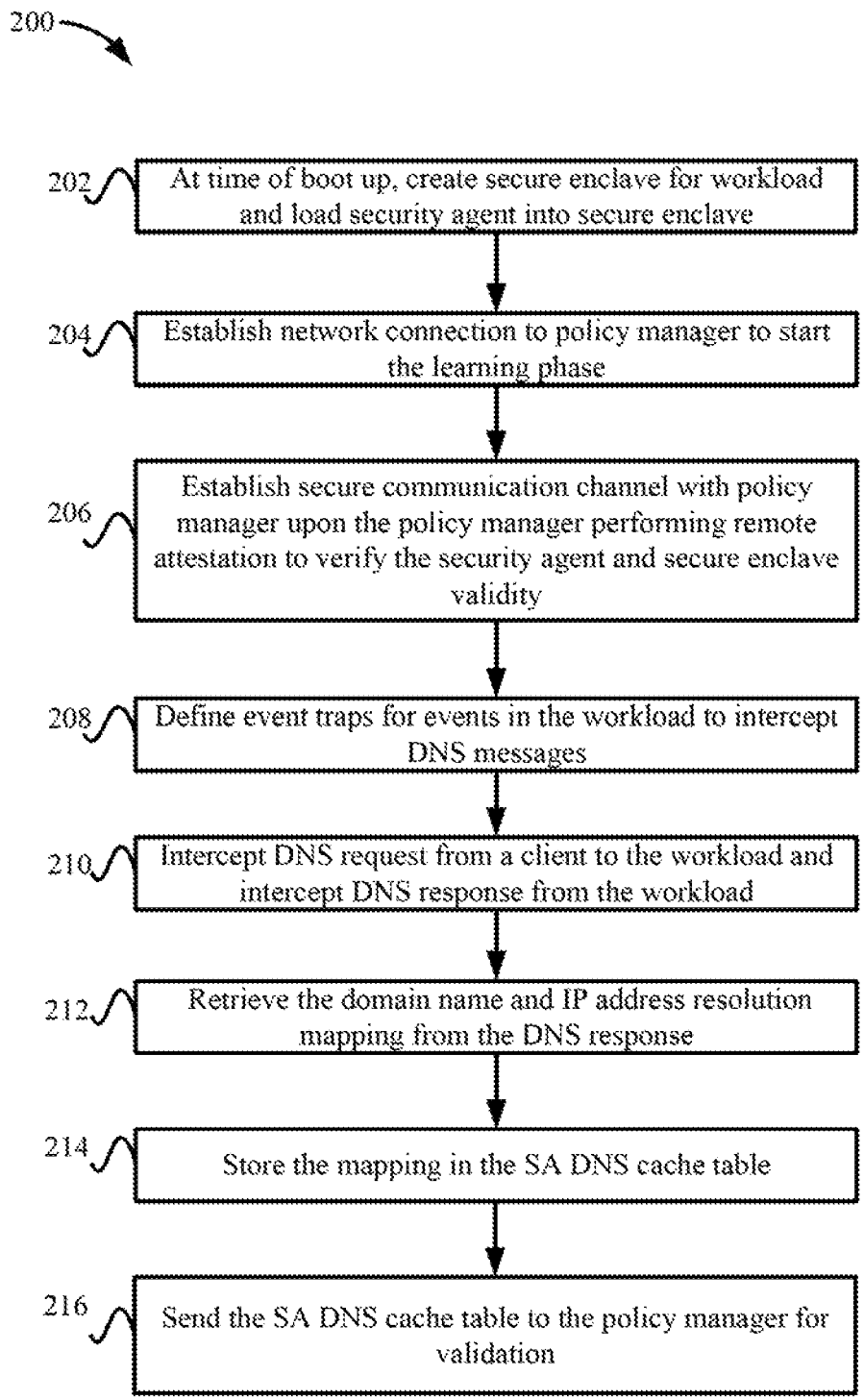
FIG. 2 depicts a simplified flowchart of the learning phase at a security agent according to some embodiments.

FIG. 2 depicts a simplified flowchart 200 of the learning phase at security agent 114 according to some embodiments. At 202, host system 104 creates a secure environment, such as secure enclave 112, for workload 110 and loads software code for security agent 114 in secure enclave 112 at the time of boot-up. Security agent 114 may be installed at the time of boot-up of workload 110, or at other times.

At 204, security agent 114 establishes a network connection to policy manager 106 to start the learning phase. The network connection may be a secure connection between security agent 114 and policy manager 106. The secure connection may be protected against outside attacks.

At 206, security agent 114 establishes a secure communication channel with policy manager 106 upon policy manager 106 performing remote attestation to verify the validity of security agent 114 and secure enclave 112. In some embodiments, policy manager 106 may verify that the correct security agent 114 is loaded into the correct secure enclave 112 in workload 110. For example, policy manager 106 may verify the identity of security agent 114 that has been loaded into a secure enclave. Also, policy manager 106 may verify secure enclave 112 is configured correctly. Then, policy manager 106 may establish the secure communication channel with security agent 114, which protects the communications between policy manager 106 and security agent 114. The secure communication channel may be established using known cryptography or other secure processes.

At 208, security agent 114 defines information, such as event traps, for events in workload 110 such that security agent 114 receives information for intercepted DNS resolution messages, such as DNS requests and/or responses. For example, the event traps may intercept (or trap) communications sent to workload 110 and/or from workload 110. In some examples, DNS resolution requests and responses are redirected to a chain on which security agent 114 listens and can review the DNS resolution requests and responses. In this way, the security agent 114 traps the DNS resolution requests and responses. Also, the event traps may be for network/socket-related events in workload 110, which may capture packets being sent to workload 110 and from workload 110. Also, security agent 114 may use hooks for send/receive/read/write system calls from workload 110 and cache table change calls to capture workload traffic. Although the above method of intercepting packets is described, various methods may be used to intercept the DNS resolution mapping.

At 210, security agent 114 may intercept a DNS resolution request from a client to workload 110 and the DNS resolution response from workload 110. The DNS resolution request may be a request to resolve a domain name to an IP address. The DNS resolution response may include the domain name to IP address mapping. That is, the DNS resolution response identifies the IP address for the domain name. Although the DNS resolution request and response may be intercepted, only the DNS resolution response may be intercepted as that response includes the resolution mapping. Accordingly, at 212, security agent 114 retrieves the domain name and IP address mapping from the DNS resolution response. Then, at 214, security agent 114 stores the mapping in the SA DNS cache table 120.

At some point, such as at defined intervals, at 216, security agent 114 sends SA DNS cache table 120 to policy manager 106 for validation. For example, every X units (e.g., seconds, minutes, hours, days, etc.), security agent 114 may send SA DNS cache table 120 to policy manager 106. However, other times may be appreciated, such as security agent 114 may send SA DNS cache table 120 to policy manager 106 whenever a new mapping is added to SA DNS cache table 120, whenever a characteristic is met, etc. As will be discussed in more detail below, policy manager 106 may validate the entries in SA DNS cache table 120. Then, after forming a DNS whitelist cache table 122, at 216, policy manager 106 sends DNS whitelist cache table 122 to security agent 114.

Figure 3:
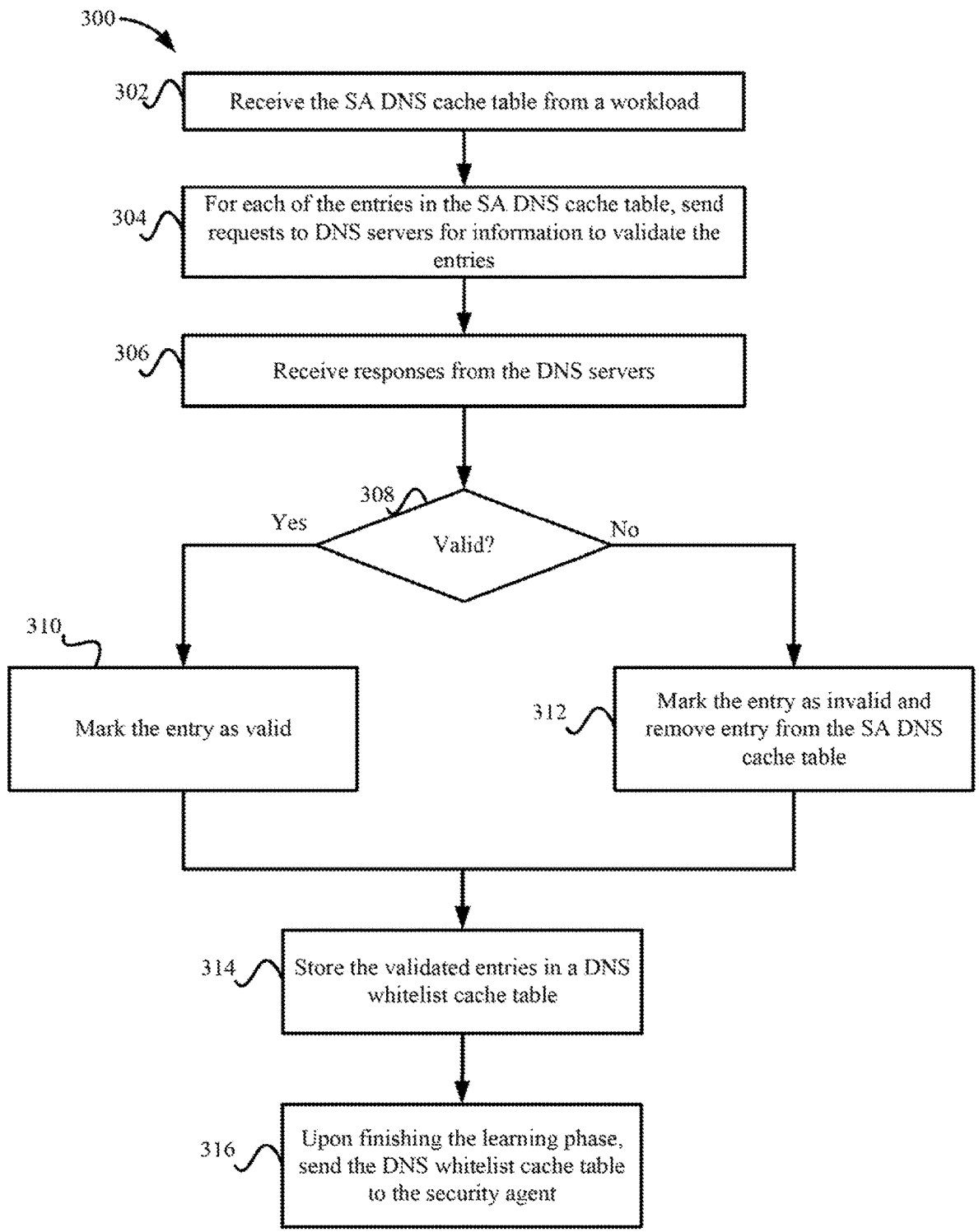
FIG. 3 depicts a simplified flowchart of a method for validating DNS resolution mappings at a policy manager according to some embodiments.

When policy manager 106 receives SA DNS cache table 120, policy manager 106 performs a validation process during the learning phase to generate DNS whitelist cache table 122. FIG. 3 depicts a simplified flowchart 300 of a method for validating DNS resolution mappings at policy manager 106 according to some embodiments. At 302, policy manager 106 receives SA DNS cache table 120 from workload 110. Policy manager 106 may receive SA DNS cache tables 120 from multiple workloads to build DNS whitelist cache table 122. The following will describe a method performed for a single workload 110, but the method may be applied to multiple workloads that send their own SA DNS cache table 120. SA DNS cache table 120 includes multiple entries of domain name to IP address resolution mappings.

Policy manager 106 may validate the entries in SA DNS cache table 120. When an entry is validated, policy manager 106 deems that resolution maps to a valid IP address. Policy manager 106 may use different methods to perform the validation. The following will describe one method. For example, at 304, for each of the entries in SA DNS cache table 120, policy manager 106 sends requests to DNS servers for information to validate the entries. In some embodiments, policy manager 106 may send a DNS lookup to map the domain name to an IP address. Also, in some embodiments, the requests may be DNS reverse lookups. For example, instead of performing a DNS resolution request for a domain name to receive an IP address, a DNS reverse lookup sends an IP address with a request for a domain name associated with the IP address.

Figure 4:
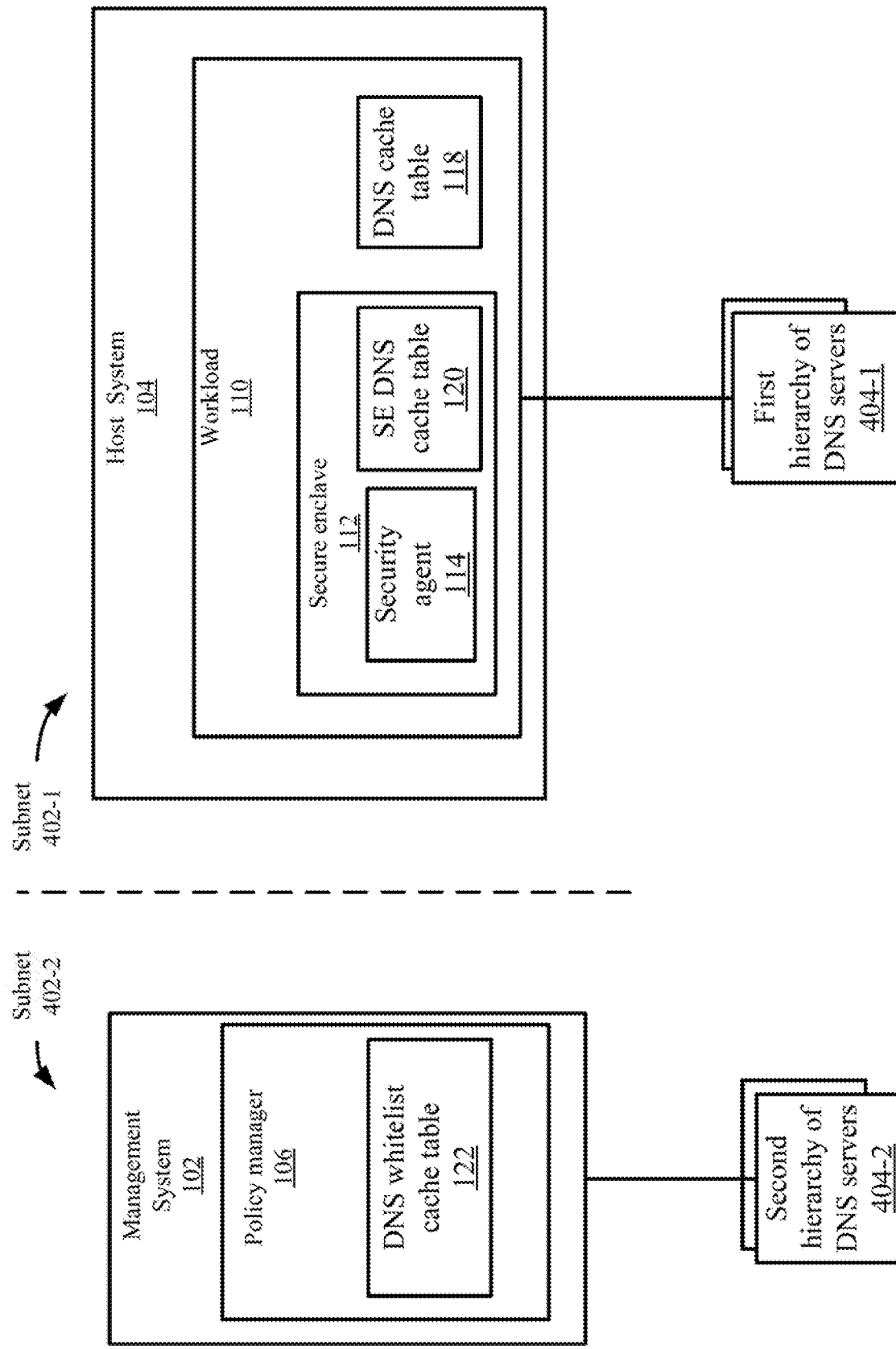
FIG. 4 depicts an example of a network according to some embodiments.

At 306, policy manager 106 receives responses from the DNS servers. In some embodiments, workload 110 and policy manager 106 may be situated in different subdivisions of a network, such as in different subnetworks. The use of different subnetworks may be used such that policy manager 106 may communicate with different DNS servers than the DNS server that workload 110 first communicated. This may avoid communicating with the same compromised server. The following describes how different DNS servers are used. FIG. 4 depicts an example of a network according to some embodiments. Workload 110 may be included in host system 104 in a first subnetwork 402-1 and management system 102 may be included in a second subnetwork 402-2. A subnetwork is a logical subdivision of an IP network. Although subnetworks are described, other sub-divisions of a network maybe used.

One reason host system 104 is included in a different subnetwork than management system 102 is based on the hierarchy system of DNS. For example, a first subnetwork may be associated with a first hierarchy of DNS servers 404-1. When a DNS resolution request is to be performed, workload 110 may send the DNS resolution request to the first DNS server 404-1 that is associated with the hierarchy assigned to subnetwork 402-1. Also, subnetwork 402-2 is associated with a second hierarchy of DNS servers 404-2. The first hierarchy and the second hierarchy may be different. For example, at least the first DNS server to contact in the first and second hierarchies is different. When policy manager 106 sends a DNS resolution request, the DNS resolution request goes to the first DNS server 404-2 in the second hierarchy. Thus, while some DNS servers 404-1 and DNS servers 404-2 may include DNS servers that are identical, the first DNS server that is contacted may be different for different subnetworks 402. Using different DNS servers may help lower the possibility of a false validation. For example, if both host system 104 and management system 102 are in the same subnetwork, both workload 110 and policy manager 106 may contact the same DNS server 404 at first. If that DNS server is compromised, then the validation by policy manager 106 may be compromised because policy manager 106 receives the same response as workload 110, which was compromised. Another way of overcoming this problem is that policy manager 106 may send the same DNS resolution request to multiple DNS servers in various subnetworks. In this case, policy manager 106 may receive responses from DNS servers that are not in the same subnetwork as workload 110.

Referring back to FIG. 3, at 308, policy manager 106 determines if the entry is valid or not. Policy manager 106 may use different methods to validate the entries. For example, policy manager 106 may use a threshold to determine if a number of the responses from the different DNS servers are the same. A threshold may be 95%, or another number, such as 51%, 90%, 100%, etc. Policy manager 106 may also determine whether or not the regular DNS lookup and the reverse DNS lookup are both valid. That is, the regular DNS lookup may need to return the correct IP address in the entry and the reverse DNS lookup may need to return the correct domain name in the entry. Other methods may also be used, such as policy manager 106 may check a blacklist that may list IP addresses that may not be valid. If the IP address is not on the blacklist, policy manager 106 does not invalidate the IP address for this method. Any combination of the above methods may be used.

If policy manager 106 determines the entry is valid, at 310, policy manager 106 marks the entry as valid. If policy manager 106 determines the entry is not valid, at 312, policy manager 106 marks the entry as invalid and may remove the entry from SA DNS cache table 120.

At 314, after validating or invalidating all the entries in SA DNS cache table 120, policy manager 106 stores the validated entries in DNS whitelist cache table 122. Accordingly, DNS whitelist cache table 122 includes only the validated entries and not the invalidated entries from SA DNS cache table 120.

Upon finishing the learning phase, at 316, policy manager 106 sends DNS whitelist cache table 122 to security agent 114. Security agent 114 may then store DNS whitelist cache table 122.

Figure 5:
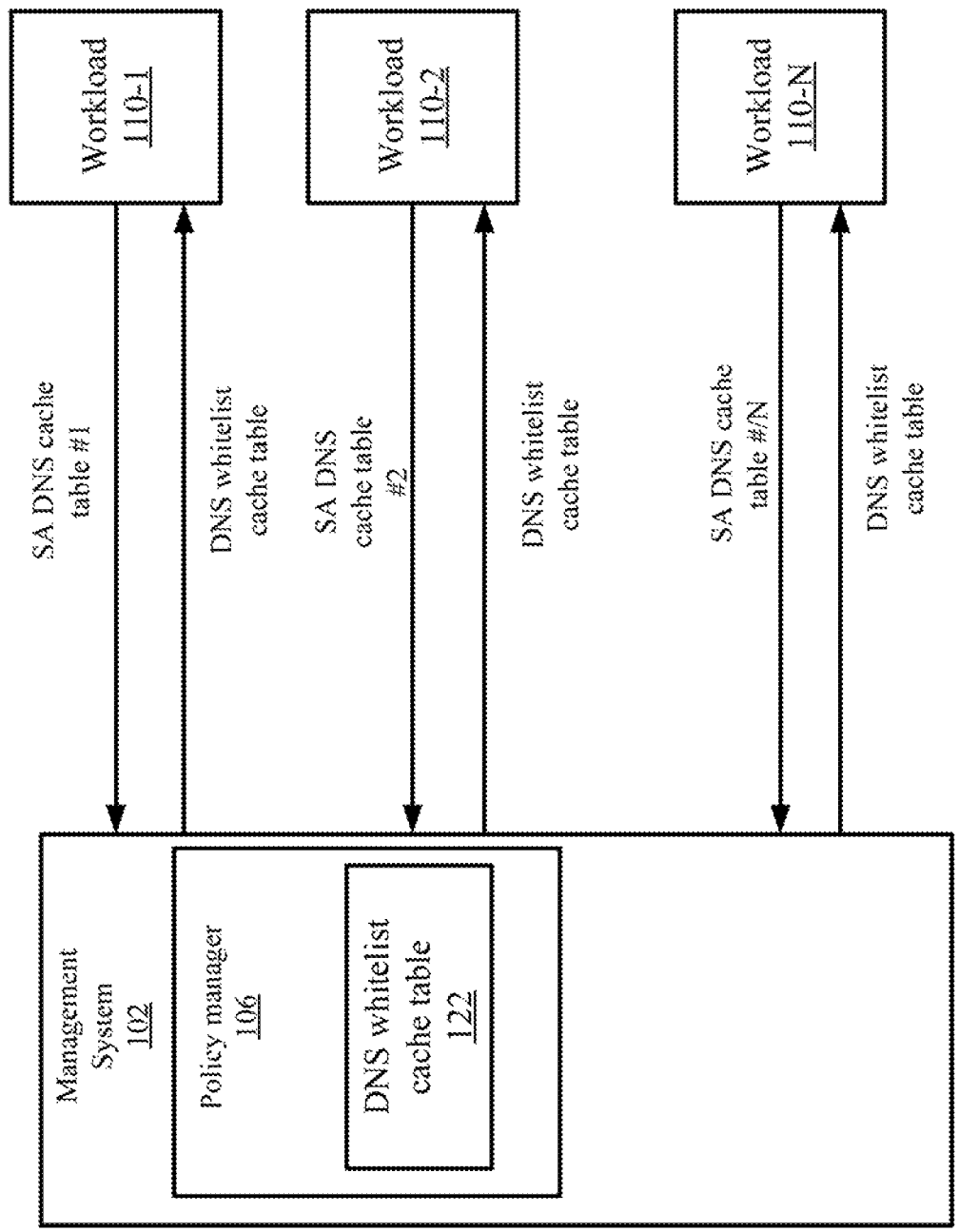
FIG. 5 depicts an example of multiple workloads that include security agent (SA) DNS cache tables that are validated according to some embodiments.

As mentioned above, DNS whitelist cache table 122 may include validated entries from multiple workloads 110 after performing the above process with multiple SA DNS cache tables 120. FIG. 5 depicts an example of multiple workloads 110 that include SA DNS caches 120 that are validated according to some embodiments. Multiple workloads 110-1, 110-2 to 110-N are included. Workloads 110 may be located in a different subnetwork than management system 102.

Each workload may send its own SA DNS cache table 120 to policy manager 106. For example, workload 110-1 sends SA DNS cache #1, workload 110-2 sends SA DNS cache #2, and workload 110-N sends SA DNS cache #N.

Policy manager 106 validates each SA DNS cache table 120 and generates DNS whitelist cache table 122. Then, policy manager 106 may send the same DNS whitelist cache table 122 to workloads 110-1 to 110-N. In other examples, policy manager 106 may send different versions of DNS whitelist cache table 122 to workloads 110-1 to 110-N. Different versions may be based on different hierarchies of DNS servers and which DNS servers should include the different DNS resolution mappings.

Detection Phase

Figure 6:
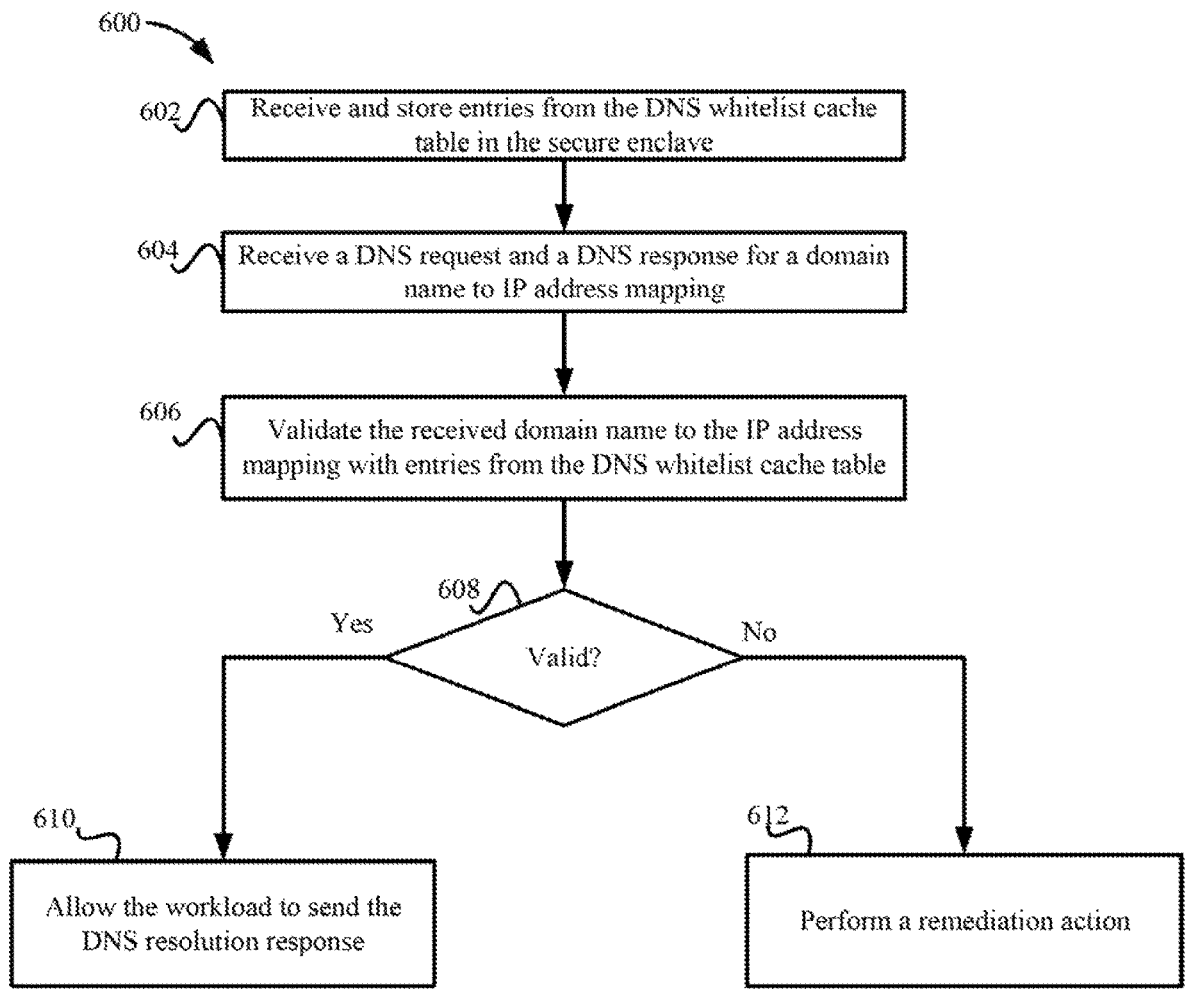
FIG. 6 depicts a simplified flowchart of a method for validating DNS resolution mappings in the detection phase according to some embodiments.

Once the learning phase is finished, security agent 114 may transition to the detection phase. FIG. 6 depicts a simplified flowchart 600 of a method for validating DNS resolution mappings in the detection phase according to some embodiments. Unlike the learning phase, security agent 114 may perform validation using entries from DNS whitelist cache table 122, which is received from policy manager 106. At 602, security agent 114 receives and stores entries from DNS whitelist 122 in secure enclave 112. In some embodiments, security agent 114 stores DNS whitelist cache table 122 separate from SA DNS cache table 120.

Security agent 114 may continue to have entries in SA DNS cache table 120 that mirror entries in WL DNS cache table 118. The separation may be maintained for validation as discussed below or to identify new resolution mappings. In other examples, DNS whitelist cache table 122 may completely replace SA DNS cache table 120. For example, any DNS to IP address resolution mappings that were stored in SA DNS cache table 120 during the learning phase may be replaced by entries in DNS whitelist cache table 122. In some cases, not all entries in DNS whitelist cache table 122 may be stored in secure enclave 112. For example, a portion of the entries are stored if the storage in secure enclave 112 is limited. The entries in DNS whitelist cache table 112 may have a time-to-live value. In some embodiments, the time-to-live value may govern how long an associated entry is valid in DNS whitelist cache table 112. Once the time-to-live value is reached, security agent 114 removes the entry from DNS whitelist cache table 122. To obtain another validated entry, security agent 114 may continue to send entries from SA DNS cache table 120 to policy manager 106 for validation. Also, policy manager 106 may continually send updates to DNS whitelist cache table 122 to workload 110. Also, policy manager 106 may increase the standard time-to-live value for entries in DNS whitelist cache table 122 than the value that is typically used for WL DNS cache table 118.

At 604, security agent 114 receives a DNS resolution request and a DNS resolution response for a domain name to IP address mapping. In some embodiments, security agent 114 may validate both the DNS resolution request and the DNS resolution response, but other validations may be appreciated, such as only validating the DNS resolution response.

At 606, security agent 114 validates the received domain name to the IP address mapping with entries from DNS whitelist cache table 122. Security agent 114 may perform different validation processes. In general, security agent 114 may detect updates to DNS whitelist cache table 122. An update may change an entry in DNS whitelist cache table 122 or add an entry to DNS whitelist cache table 122. Security agent 114 may validate that a DNS resolution response includes a valid domain name to the IP address mapping. In the response validation, security agent 114 may compare the IP address associated with the domain name in the received DNS resolution response to the IP address listed for a corresponding domain name in DNS whitelist cache table 122. The comparison checks whether the DNS resolution response is changing the IP address for an existing resolution mapping in DNS whitelist cache table 122. In some embodiments, security agent 114 may also use the DNS resolution request in the validation. Security agent 114 may check whether the DNS resolution request in is SA DNS cache table 120 to determine whether this workload 110 is responding to the DNS resolution request with a DNS resolution response. The validation may pinpoint which DNS server is responding to the DNS resolution request. If SA DNS cache table 120 mirrors the entries in WL DNS cache table 118, then when SA DNS cache table 120 includes the domain name in the DNS resolution request, that workload 110 is responding to the request. However, when SA DNS cache table 120 does not include the domain name in the DNS resolution request, that workload 110 is not responding to the request. As discussed above, workload 110 may determine the DNS resolution response in different ways. If workload 110 does not include the mapping in WL DNS cache table 118, workload 110 may send the request to another DNS server for the DNS resolution mapping. The validation may indicate that this workload 110 is not responding to the DNS resolution request and that another workload 110 may be compromised.

At 608, security agent 114 determines if the received domain name to IP address mapping is valid. For example, if the received domain to IP address mapping does not change the IP address for the domain name for a corresponding entry in DNS whitelist cache table 122, at 610, security agent 114 allows workload 110 to send the DNS resolution response.

At 612, if security agent 114 determines that the domain name to IP address mapping is not valid, security agent 114 performs a remediation action. For example, security agent 114 may not allow workload 110 to send the DNS resolution response. For example, if a domain name #1 is resolved to an IP address #1 in DNS whitelist cache table 122, but the DNS resolution response states the domain name now points to IP address #X instead of IP address #1 due to a cache poisoning event. In this case, another DNS server may send a DNS resolution response mapping domain name #1 to IP address #X. The cache poisoning event may occur because workload 110 did not have the resolution mapping stored in WL DNS cache table 118 and sent a DNS resolution mapping request to another DNS server, and the response is compromised. For example, the time-to-live value may have been reached, which caused workload 110 to remove that entry from WL DNS cache table 118 and send another DNS resolution request to another DNS server, and the response is compromised.

Security agent 114 may also perform other remediation actions when an invalid DNS resolution response is found. The remediation activity may include inserting the correct IP address in the domain name to IP address mapping for the DNS resolution mapping. For example, security agent 114 may replace IP address #X with IP address #1 for domain name #1. Then, security agent 114 can direct workload 110 to insert the domain name to IP address mapping of domain name #1 to IP address #1 in WL DNS cache table 118. Workload 110 may thereafter submit a response to a client with the correct DNS resolution mapping. Also, security agent 114 may raise an alert based on the failed validation. For example, security agent 114 may contact policy manager 106 with the DNS resolution mapping that was invalidated. Policy manager 106 may then perform further actions, such as adding the DNS resolution mapping to a global blacklist. Further, if policy manager 106 receives the validation from the same DNS resolution mapping, policy manager 106 may raise the condition of the alarm to perform another action, such as shutting down a workload or quarantining a workload.

CONCLUSION

Accordingly, security agent 114 may provide a validation service for DNS resolution mappings that can detect a change in the resolution mappings and perform some action. Because security agent 114 is included in secure enclave 112, SA DNS cache table 120 or the received DNS whitelist cache table 122 may not be compromised by an attacker. Accordingly, security agent 114 can be trusted to validate updates to WL DNS cache table 118. DNS cache attacks can be detected and corrected automatically using security agent 114 and DNS whitelist cache table 122.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
    at a host computer:
        intercepting domain name system (DNS) resolution mappings from DNS responses being sent by a DNS server executing on the host computer;
        storing the DNS resolution mappings that map a plurality of domain names to a plurality of network addresses in a first table;
        sending the first table to a manager for validation of the DNS resolution mappings, said first table comprising a first plurality of entries with each entry providing a mapping that maps a domain name to a network address;
        receiving a second table from the manager that contains validated entries for validated DNS resolution mappings, the second table comprising a second plurality of entries with each entry associating a domain name to a network address, said second plurality of entries comprising fewer entries than the first plurality of entries as one or more entries from the first plurality of entries were removed by the manager as being invalid entries;
        intercepting a DNS response that includes a domain name to address resolution mapping from the DNS server; and
        validating the domain name to address resolution mapping using a validated DNS resolution mapping in the second table.

2. The method of claim 1, wherein at least a portion of the DNS resolution mappings in the first table are included in a third table, wherein the third table is used by the DNS server to respond to DNS resolution mapping requests that request the address for a domain name.

3. The method of claim 1, wherein validating the domain name to address resolution mapping comprises:
    determining if the domain name to address resolution mapping changes an address in a corresponding entry in the second table for the domain name.

4. The method of claim 1 further comprising:
    when the domain name to address resolution mapping is not validated, performing an action that includes not allowing the DNS server to send the DNS response to another entity.

5. The method of claim 1, wherein the second table includes validated DNS resolution mappings that are validated from DNS resolution mappings received from multiple DNS servers.

6. The method of claim 1, wherein the DNS server and the manager are located in different divisions of a network such that the DNS server is associated with a first hierarchy of DNS servers and the manager is associated with a second hierarchy of DNS servers.

7. The method of claim 1 further comprising:
    storing the second table in a secure area that is not accessible by a workload implementing the DNS server.

8. A non-transitory computer-readable storage medium containing instructions, that when executed, control a computer system to be operable for:
    storing, by a computing device, domain name system (DNS) resolution mappings from a domain name to an address in a first table, wherein the DNS resolution mappings are intercepted from DNS responses being sent by a DNS server;
    sending, by the computing device, the first table to a manager for validation of the DNS resolution mappings;
    receiving, by the computing device, a second table from the manager that contains validated DNS resolution mappings;
    intercepting, by the computing device, a DNS response that includes a domain name to address resolution mapping from the DNS server; and
    validating, by the computing device, the domain name to address resolution mapping using a validated DNS resolution mapping in the second table.

9. The non-transitory computer-readable storage medium of claim 8, wherein at least a portion of the DNS resolution mappings in the first table are included in a third table, wherein the third table is used by the DNS server to respond to DNS resolution mapping requests that request the address for a domain name.

10. The non-transitory computer-readable storage medium of claim 8, wherein validating the domain name to address resolution mapping comprises:
    determining if the domain name to address resolution mapping changes an address in a corresponding entry in the second table for the domain name.

11. The non-transitory computer-readable storage medium of claim 8, wherein the instructions control the computer system to be further operable for:
    when the domain name to address resolution mapping is not validated, performing an action that includes not allowing the DNS server to send the DNS response to another entity.

12. The non-transitory computer-readable storage medium of claim 8, wherein the second table includes validated DNS resolution mappings that are validated from DNS resolution mappings received from multiple DNS servers.

13. The non-transitory computer-readable storage medium of claim 8, wherein the DNS server and the manager are located in different divisions of a network such that the DNS server is associated with a first hierarchy of DNS servers and the manager is associated with a second hierarchy of DNS servers.

14. The non-transitory computer-readable storage medium of claim 8, wherein the instructions control the computer system to be further operable for:

storing the second table in a secure area that is not accessible by a workload implementing the DNS server.

15. A method comprising:
receiving, by a computing device, a first table including a first DNS resolution mapping for a domain name to an address, the first DNS resolution mapping determined from a DNS response by a DNS server;
communicating, by the computing device, with a set of DNS servers to receive a second resolution mapping for the first DNS resolution mapping in the first table;
comparing, by the computing device, the domain name or the address in the received second resolution mapping with a corresponding domain name or a corresponding address in the first DNS resolution mapping;
validating, by the computing device, the first DNS resolution mapping based on the comparing;
when the first DNS resolution mapping is validated, adding, by the computing device, the first DNS resolution mapping to a second table;
when the first DNS resolution mapping is not validated, not adding, by the computing device, the first DNS resolution mapping to the second table; and
sending, by the computing device, the second table to an agent for use in validating DNS resolution responses by the DNS server.

16. The method of claim 15, wherein comparing the domain name or the address comprises:
comparing whether the address is a same value from multiple second resolution mappings, wherein a lookup to determine the address is performed using the domain name from the first DNS resolution mapping.

17. The method of claim 15, wherein comparing the domain name or the address comprises:
comparing whether the domain name is a same value from multiple second resolution mappings, wherein a reverse lookup to determine the domain name is performed using the address from the first DNS resolution mapping.

18. The method of claim 15, wherein comparing the domain name or the address comprises:
comparing whether the address or the domain name is a same value from multiple second resolution mappings.

19. The method of claim 15, wherein the set of DNS servers are located in different divisions of a network such that the DNS server is associated with a first hierarchy of DNS servers and another DNS server in the set of DNS servers is associated with a second hierarchy of DNS servers.

20. The method of claim 15, wherein the second table includes validated DNS resolution mappings that are received in first tables from different DNS servers.

* * * * *